United States Patent [19]
Lee et al.

[11] Patent Number: 6,110,401
[45] Date of Patent: *Aug. 29, 2000

[54] METHOD AND APPARATUS FOR REPLICATING LIGHT SHAPING SURFACE STRUCTURES ON A RIGID SUBSTRATE

[75] Inventors: Kang S. Lee, Woodland Hills; Abbas Hosseini; Gajendra D. Savant, both of Torrance, all of Calif.

[73] Assignee: Physical Optics Corporation, Torrance, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 09/138,798

[22] Filed: Aug. 24, 1998

[51] Int. Cl.⁷ .............................. B29D 11/00; B29C 59/04
[52] U.S. Cl. .......................... 264/1.34; 264/1.6; 264/1.7; 264/284; 264/293; 264/1.38; 425/174.4; 425/363; 425/385
[58] Field of Search ............................. 264/1.6, 1.7, 1.34, 264/2.7, 284, 293, 1.38; 425/374, 385, 363, 373, 174.4; 156/58

[56] References Cited

U.S. PATENT DOCUMENTS

| | | | |
|---|---|---|---|
| 2,694,226 | 11/1954 | Luboshez | 425/374 |
| 5,124,089 | 6/1992 | Ohkoshi et al. | 264/1.6 |
| 5,183,599 | 2/1993 | Lu | 264/1.7 |
| 5,312,569 | 5/1994 | Mezei | 264/1.6 |
| 5,312,570 | 5/1994 | Halter | 264/1.6 |
| 5,874,132 | 1/1999 | Jung | 427/278 |

*Primary Examiner*—Mathieu D. Vargot
*Attorney, Agent, or Firm*—Nilles & Nilles, S.C.

[57] ABSTRACT

A simple, fast, and reliable method and apparatus are provided for replicating a light shaping surface structure on a laminated surface of a relatively rigid substrate. More specifically, after the substrate is mounted on a table and a layer of epoxy is deposited between the substrate and a submaster to produce a layered structure, the layered structure is automatically compressed in a nip formed between the table and an outer surface of a rotating impression roller, thereby replicating the surface structure in the epoxy layer. The epoxy is then cured, and the submaster is separated from the substrate to leave a laminated structure having the light shaping surface structure on a surface thereof. Preferably, the submaster is wrapped around the impression roller, and the impression roller is rotated while the table is reciprocated linearly to compress the layered structure in the nip. In order to prevent slippage between the submaster and the substrate, the rotational speed of the impression roller is matched to the translational speed of the table during the compressing operation—preferably by using the submaster as a drive belt to drive the roller to rotate upon table movement. The replicator preferably also automatically cures the epoxy after the compressing operation and then automatically separates the submaster from the substrate.

28 Claims, 10 Drawing Sheets

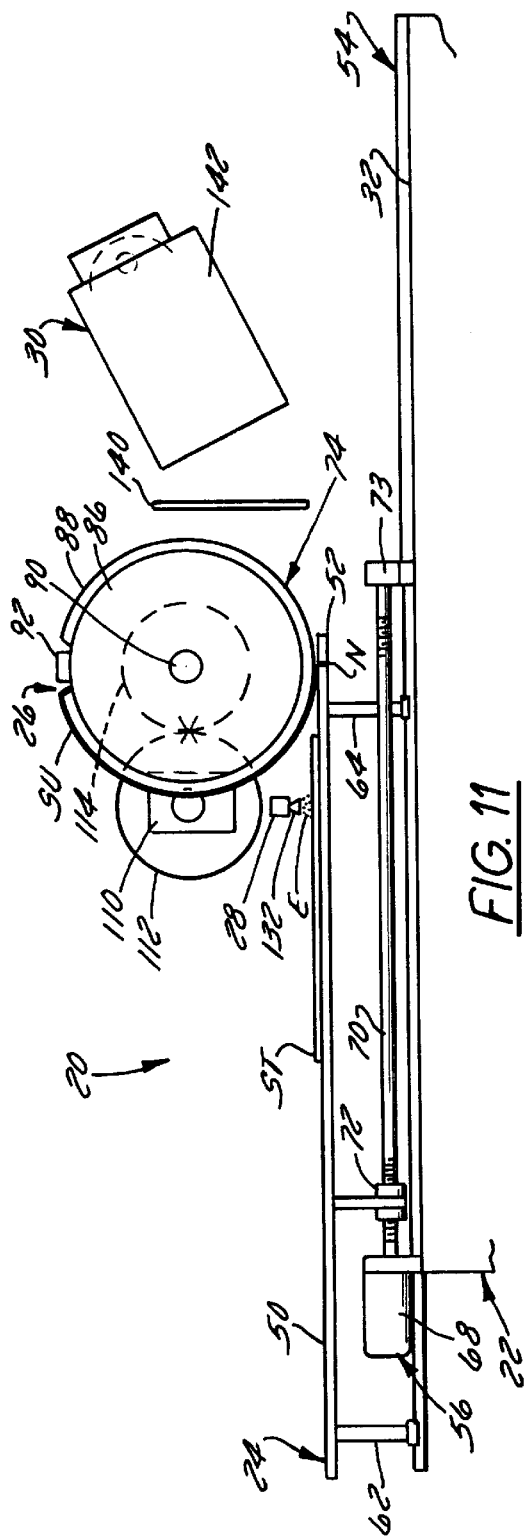
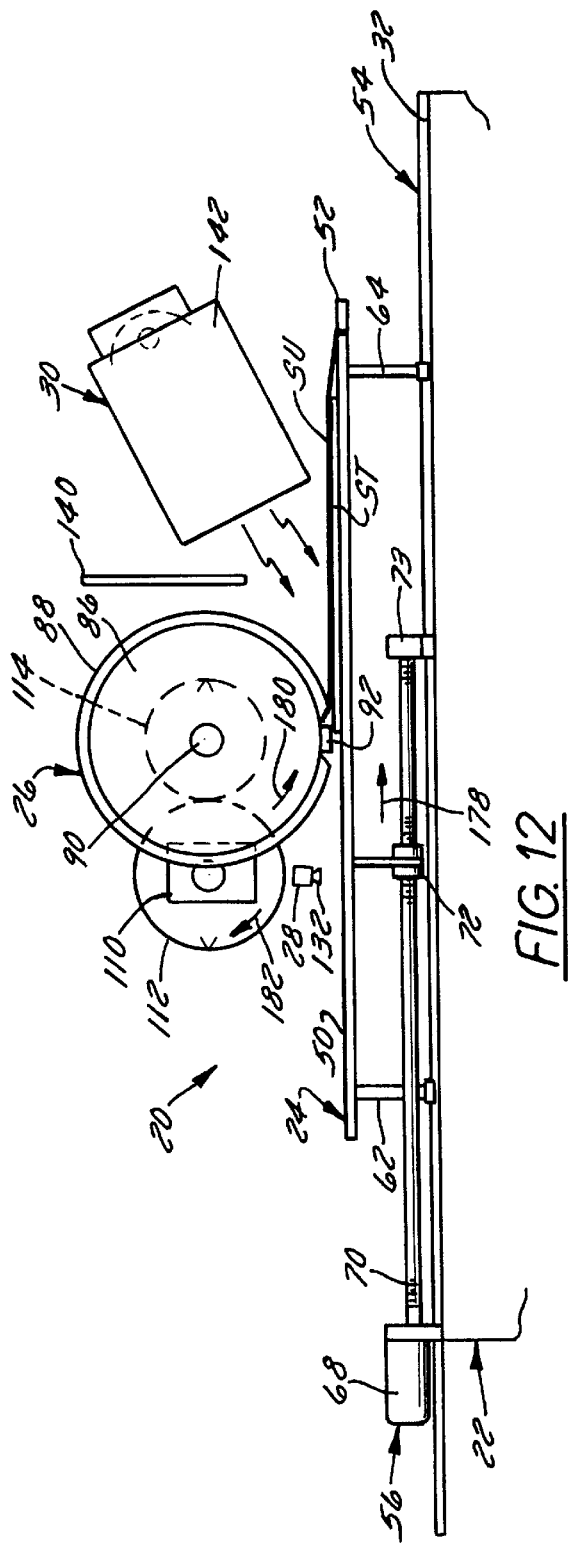
FIG. 11
FIG. 12

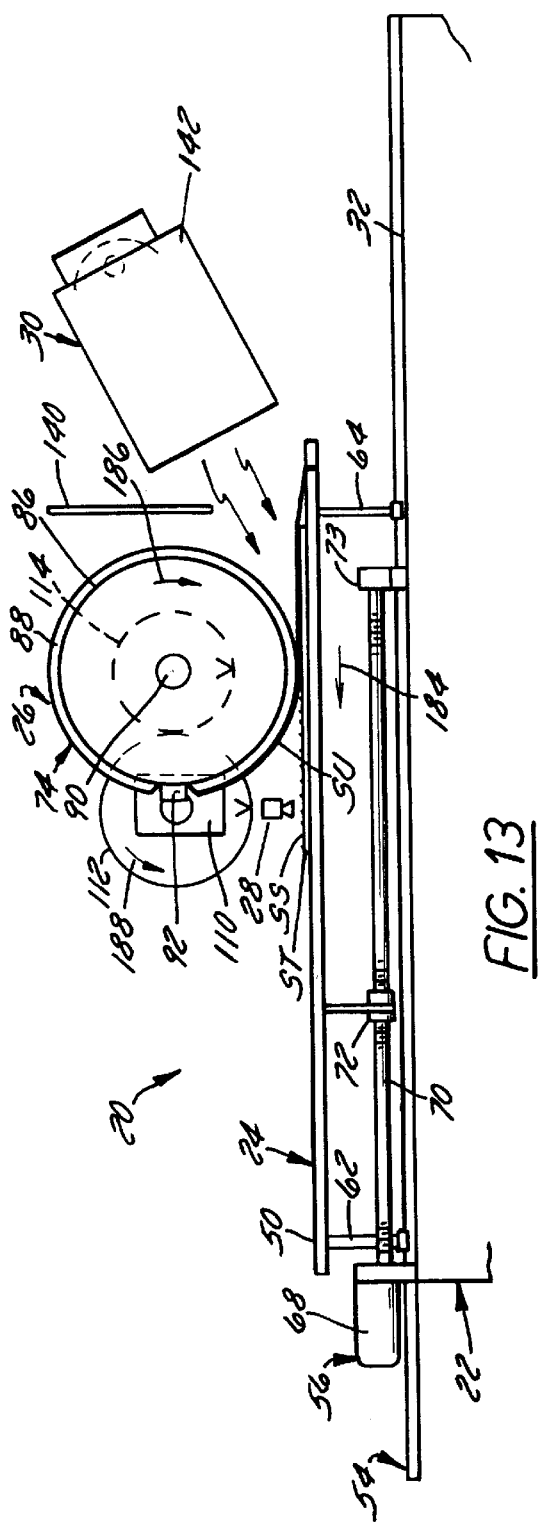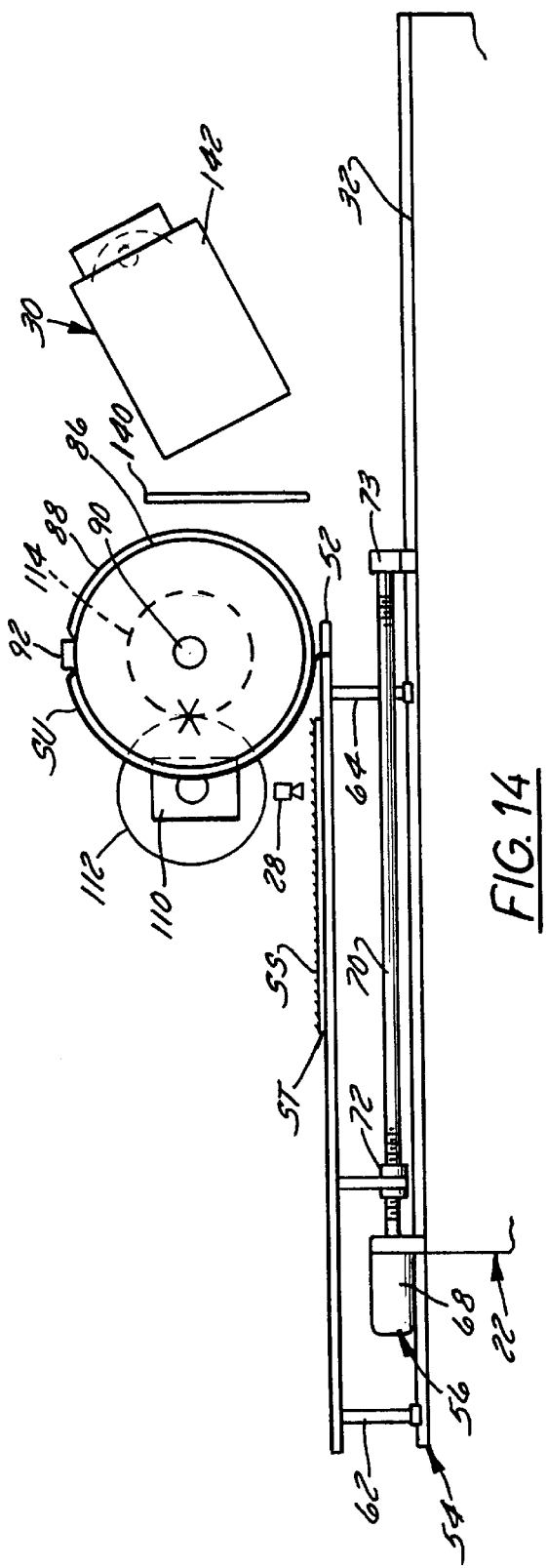

METHOD AND APPARATUS FOR REPLICATING LIGHT SHAPING SURFACE STRUCTURES ON A RIGID SUBSTRATE

BACKGROUND OF THE INVENTION

1. Field of the Invention

The invention relates to the manufacture of laminated components. More particularly, the present invention relates to a method of manufacturing laminated optical components by the replication of a light shaping surface structure on a rigid substrate. The invention additionally relates to an apparatus for performing this method.

2. Discussion of the Related Art

Methods of replicating optical components on substrates to achieve final products having desired surface characteristics are well known. Final products include viewing screens and homogenizers and are each characterized by a light shaping surface structure on at least one surface thereof. These products are made by 1) generating a surface structure on a photosensitive medium using coherent light, 2) processing the medium, and 3) replicating the surface structure in epoxy. Due to shrinkage of the photosensitive material at different stages of processing, at least one and usually several generations of submasters, made in sequence, are usually required to produce an optical product having the desired optical characteristics. In the final stage, a reusable submaster containing the desired surface structure is pressed against a substrate that has been coated with a layer of liquid epoxy. The liquid epoxy is then cured and the submaster is removed from the substrate/cured epoxy laminate. Depending upon the application, the substrate may comprise either a flexible thin film or a thick and relatively rigid substrate such a polycarbonate, glass, or acrylic. The invention is concerned with replicating surface structures on rigid substrates of this type.

Surface structures were heretofore replicated on rigid substrates either manually or semi-automatically. Both of these processes exhibit distinct drawbacks and disadvantages.

The manual process comprises four steps. First, a substrate is laid on a rigid, flat surface, and a layer of epoxy is dispensed onto the substrate. Then, a flexible plastic submaster is laid on top of the substrate to sandwich the epoxy layer between the substrate and the submaster to form a layered structure. The submaster contains the surface structure of interest on a surface thereof which faces the substrate. Then, a neoprene-coated roller or rubber-coated roller is manually rolled over the layered structure so that the layered structure is compressed through a line-to-surface contact caused by interaction of the roller and the flat surface. This compression replicates the surface structure of interest in the epoxy layer. The epoxy is then cured via exposure to ultraviolet (UV) light to form a laminated substrate covered with the submaster. Finally, the submaster is manually peeled from the laminated substrate.

The manual replication process is very laborious and time consuming, with the typical production rate ranging from five-to-ten units per hour, depending upon the complexity of the replicated surface structure. In addition, it is very difficult to assure uniform pressure application during the pressing process. This is problematic because uneven pressure application may result in inconsistencies in the finished product. These problems may be compounded if a non-uniform layer of epoxy is deposited onto the substrate prior to the laying down of the submaster onto the substrate and the subsequent pressing operation.

The semi-automatic process uses a machine known as a laminator to compress the layered substrate/epoxy/submaster structure. The laminator comprises first and second nip rolls which are driven in opposite directions to pull the layered structure through a nip formed between the first and second nip rolls. The first nip roll is driven by a DC electric motor or the like, and the second nip roll is driven by way of meshing contact between a driven gear on the second nip roll and a drive gear on the first nip roll. The layered structure is compressed as it is pulled through the nip. The operator then 1) exposes the compressed layered structure to UV light to cure the epoxy and to form a laminated substrate and 2) manually peels the submaster from the laminated substrate in the same manner as in the manual process.

While the semi-automatic process is marginally faster than the manual process, it does not necessarily produce a better-quality product for several reasons. First, because the layered structure experiences line-to-line contact in the nip rather than the line-to-surface contact experienced during the manual process, the layered structure tends to teeter or rock about the nip rolls as the operator feeds the structure through the nip. Unevenness in pressure application therefore can result. Second, speed differentials tend to exist between the two nip rolls due to backlash in the gearing coupling the nip rolls to one another. These speed differentials can result in slippage between the two surfaces of the pressed layered structure during the compressing operation. This slippage further degrades the quality of the finished product. In addition, excess liquid epoxy is often squeezed out of the layered structure during the compressing process and must be wiped off before the submaster is peeled from the substrate. This liquid epoxy may seep between the submaster and the substrate while the compressed layered structure is being transferred to the UV source, thereby damaging the product.

The need therefore exists to provide a machine that can 1) relieve the tedium and slow production rate of a manual replication process and 2) assure a good-quality product by uniformly pressing a submaster and substrate together with little or no slippage therebetween.

OBJECTS AND SUMMARY OF THE INVENTION

A first principal object of the invention is to provide a fast and reliable method of automatically replicating a light shaping surface structure on a relatively rigid substrate by automatically compressing the substrate, a submaster, and an intervening layer of epoxy.

In accordance with a first aspect of the invention, this object is achieved by first positioning a layered structure in a nip formed between an outer surface of an impression roller and a table, the layered structure including 1) a relatively rigid substrate which is supported on the table, 2) a submaster which has the light shaping surface structure on a surface thereof which faces toward the table, and 3) a layer of epoxy disposed between the substrate and the submaster. The method also includes automatically compressing the layered structure in the nip so as to replicate the surface structure on the layer of epoxy. Other steps include curing the epoxy and separating the submaster from the substrate to leave a substrate/epoxy laminate having the light shaping surface structure on a surface thereof.

In order to maximize speed and automation, the epoxy deposition step, epoxy curing step, and submaster separation step are also preferably performed automatically.

Preferably, the compressing step comprises rotating the roller about a non-translating axis while translating the table with respect to the roller.

Another object of the invention is to provide a method that meets the first principal object and that prevents slippage between the submaster and the substrate during the pressing operation.

This object is achieved by correlating movement of the roller with movement of the table so that a linear velocity of the outer surface of the roller at least substantially equals a linear velocity of the table. This correlation preferably comprises transmitting driving forces to the roller from the table via the submaster so that the submaster progressively unwraps from the roller and is pressed against the substrate in the nip to form the layered structure.

In order to facilitate automatic separation of the submaster from the laminated substrate, the table preferably reciprocates through a forward stroke and a return stroke, such that the table drives the roller to rotate only during the forward stroke. The separating step comprises driving the roller to rotate in a wrapping direction during the return stroke of the table to progressively 1) peel the submaster from the laminate and 2) wrap the submaster back onto the roller.

A second principal object of the invention is to provide a replicator that is capable of automatically replicating a light shaping surface structure, formed on the surface of a submaster, onto a surface of a relatively rigid laminated substrate.

In accordance with still another aspect of the invention, this object is achieved by providing a replicator including a table, an impression roller, and a drive arrangement. The table has a generally planar support surface, and is movable at least generally in parallel with a direction of extension of the support surface. The impression roller has an outer surface which is spaced from the support surface of the table to form a nip therebetween. The roller is mounted on a support shaft extending axially with respect to the roller and laterally with respect to the table. The roller also is configured to receive a submaster on the outer surface thereof, the submaster having the surface structure on a surface thereof which faces away from the roller. The drive arrangement drives the table and the roller such that, as the table moves through the nip, the roller rotates at a rotational velocity at which a linear velocity of the outer surface of the roller at least substantially equals a linear velocity of the table, thereby compressing the substrate and the submaster in the nip.

Preferably, in order to maximize operation, the replicator further includes an automatically operating epoxy dispenser located upstream of the impression roller and an automatically operating epoxy curing arrangement located downstream of the impression roller.

Another object of the invention is to provide a replicator that meets the second primary object and that correlates roller speed with table speed so as to prevent slippage therebetween during a pressing process.

This object is achieved by arranging the table and the impression roller such that a first end of a submaster can be attached to the roller and a second end of the submaster can be attached to the table. The submaster is wrappable at least part-way around the outer surface of the roller. The drive arrangement preferably further comprises a rewrapping drive device which, during return strokes of the table, drives the roller to wrap the submaster back onto the outer surface of the roller. The rewrapping drive device preferably comprises 1) a rotary cylinder, 2) a pinion which is driven to rotate by the rotary cylinder, and 3) a driven gear which meshes with the pinion and which is mounted on the roller drive shaft.

Other objects, features, and advantages of the invention will be better understood when considered in conjunction with the following description and the accompanying drawings. It should be understood, however, that the following description while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which:

FIGS. 11–14 are a series of schematic side elevation views illustrating an operational sequence of the replicator.

DETAILED DESCRIPTION OF THE PREFERRED EMBODIMENTS

1. Resume

Figure 1:
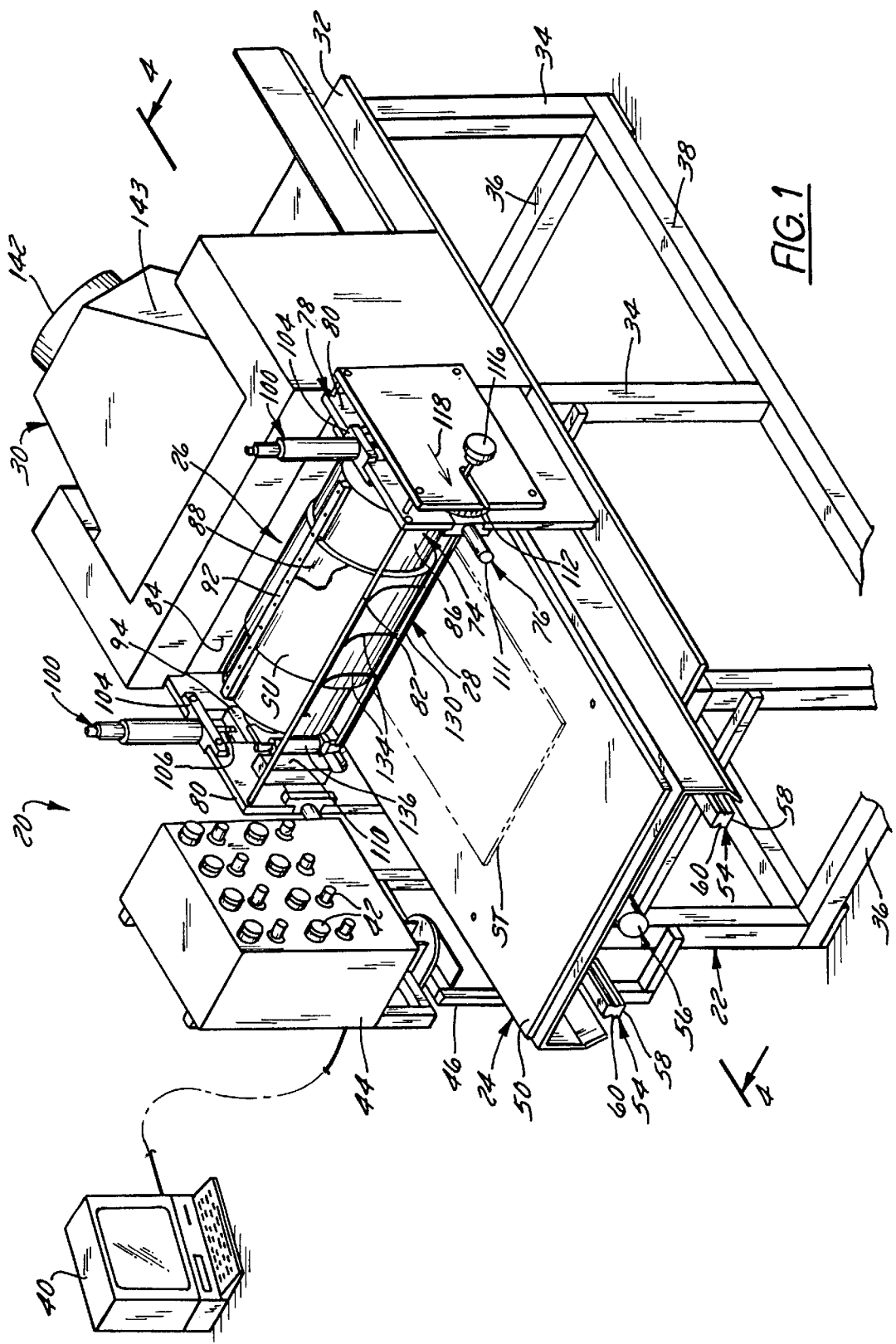
FIG. 1 is a perspective view of a replicator constructed in accordance with a preferred embodiment of the invention.
Figure 2:
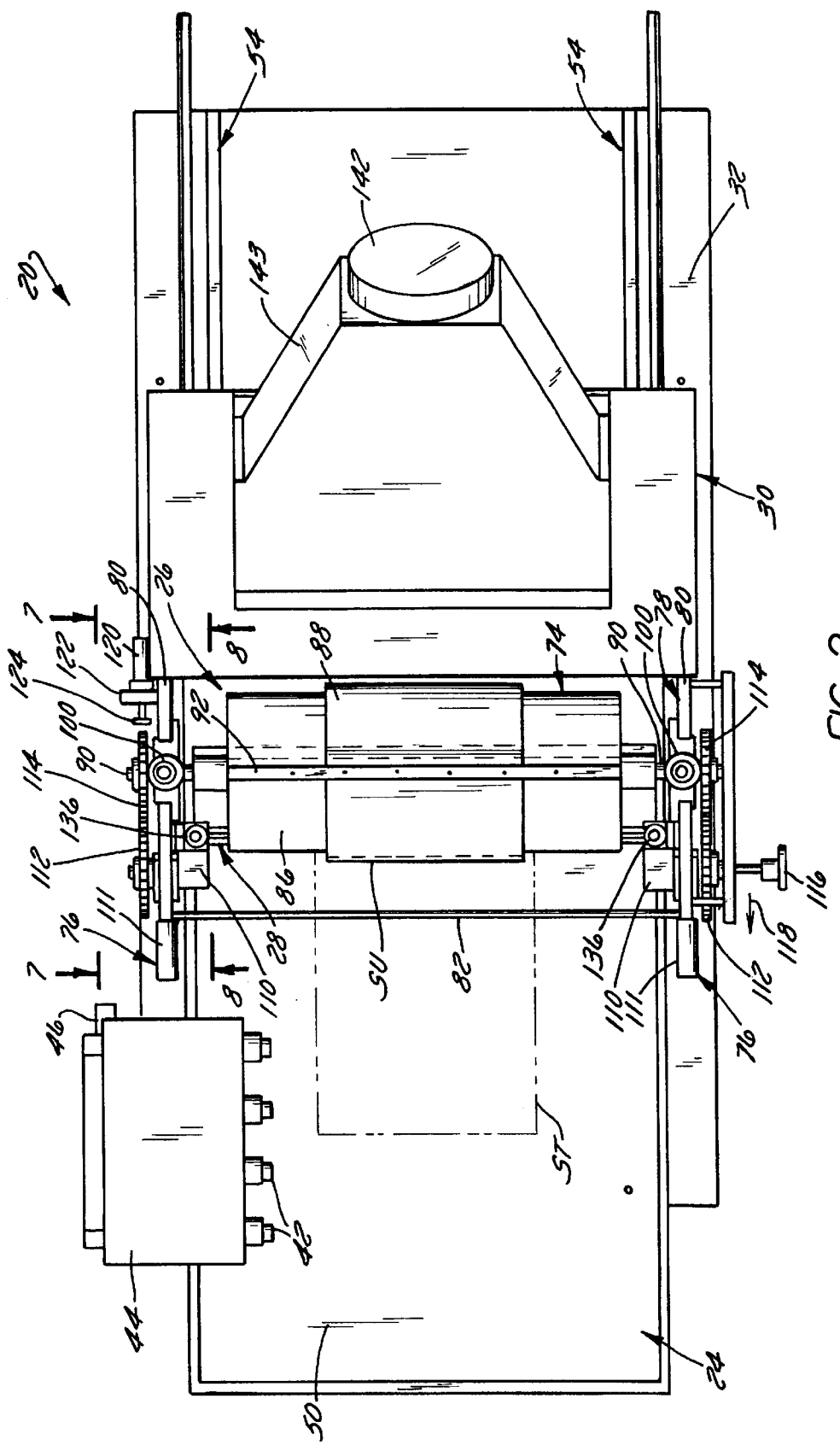
FIG. 2 is a top plan view of the replicator of FIG. 1.
Figure 3:
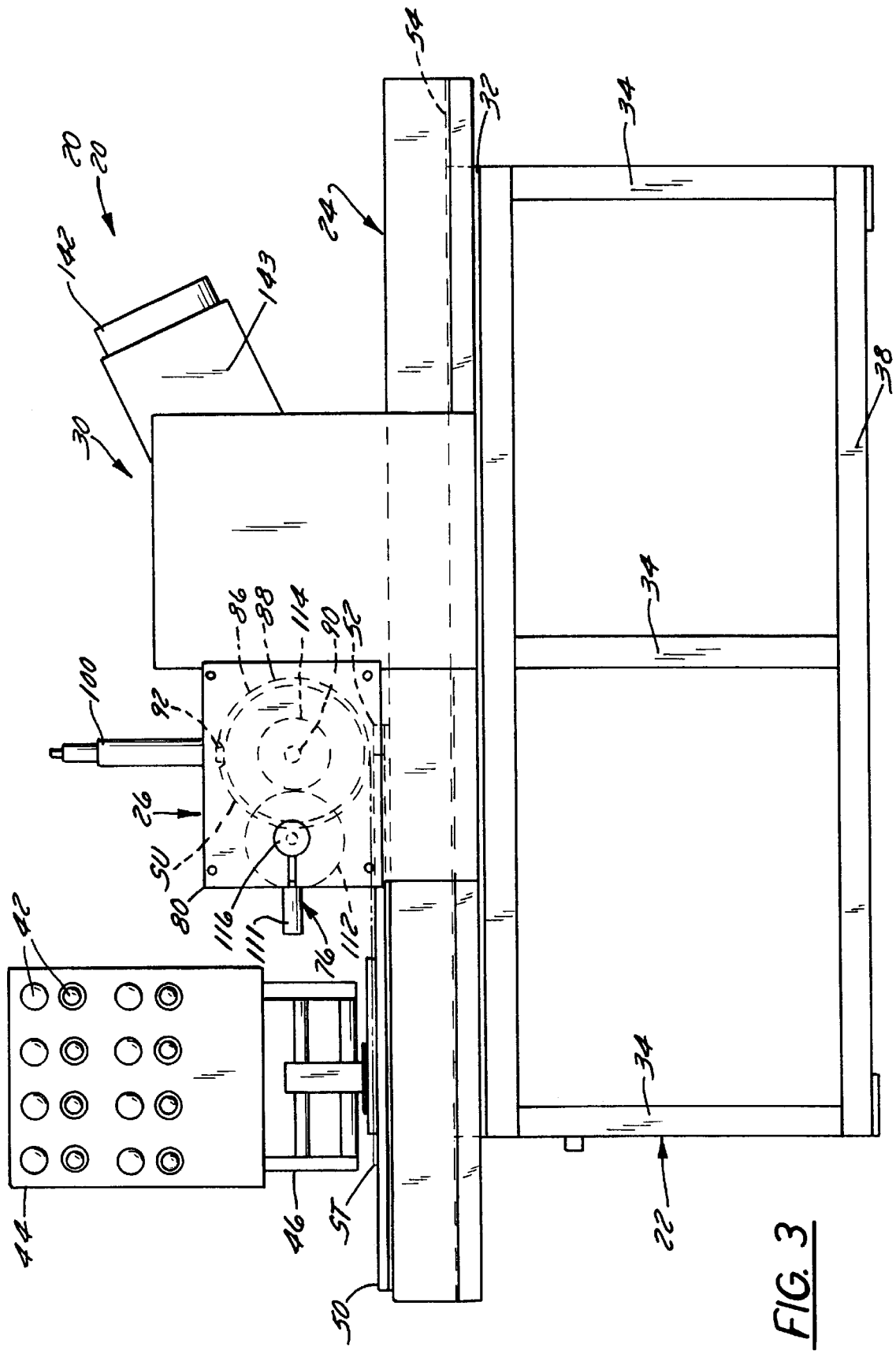
FIG. 3 is a side elevation view of the replicator.

Pursuant to the invention, a simple, fast, and reliable method and apparatus are provided for replicating a light shaping surface structure on a laminated surface of a relatively rigid substrate. More specifically, after the substrate is mounted on a table and a layer of epoxy is deposited between the substrate and a submaster to produce a layered structure, the layered structure is automatically compressed in a nip formed between the table and an outer surface of a rotating impression roller, thereby replicating the surface structure in the epoxy layer. The epoxy is then cured, and the submaster is separated from the substrate to leave a laminated structure having the light shaping surface structure on a surface thereof. Preferably, the submaster is wrapped around the impression roller, and the impression roller is rotated while the table is reciprocated linearly to compress the layered structure in the nip. In order to prevent slippage between the submaster and the substrate, the rotational speed of the impression roller is matched to the translational speed of the table during the compressing operation—preferably by using the submaster as a drive belt to drive the roller to rotate upon table movement. The replicator preferably also automatically cures the epoxy after the compressing operation and then automatically separates the submaster from the substrate.

2. Construction of Replicator

Referring now to the drawings and initially to FIGS. 1–4 and 10, a replicator 20 is illustrated that is capable of operating as described in Section 1 above. The replicator 20 includes a support frame 22 on which is mounted 1) a translatable table 24, 2) an impression roller assembly 26, 3) an epoxy dispenser assembly 28 located upstream of the impression roller assembly 26, and 4) an epoxy curing apparatus 30 located downstream of the impression roller assembly 26. The support frame 22 includes an upper horizontal support surface 32, a plurality of vertical supports 34, and a plurality of lateral supports 36 and longitudinal supports 38. All of the powered structures are preferably controlled by a computer 40 and manual controls 42. All manual controls 42 are mounted on a control box 44 that is mounted on an arm 46 that can swing in and out with respect to the support frame 22, thereby providing access to the side of the replicator 20 when desired. In the illustrated embodiment, the table 24 lies in a horizontal plane, and the impression roller assembly 26, epoxy dispenser assembly 28, and epoxy curing apparatus 30 are all mounted above the table 24. While the description that follows reflects this preferred arrangement, it should be understood that other, inclined or even inverted table orientations and corresponding orientations of the other components could be possible.

Each of the major components of the replicator 20 now will be described in turn.

The purpose of the table 24 is to convey a substrate ST mounted thereon past the epoxy dispenser 28, the impression roller assembly 26, and the epoxy curing apparatus 30 in coordinated operation with all of those devices. The table 24 may comprise any structure having a translatable relatively flat surface the movement of which can be precisely controlled. In the illustrated embodiment, the table 24 comprises a rectangular slab which is supported on the upper support surface 32 of the support frame 22. The table 24 has a flat top 50 lying in a horizontal plane. A laterally-extending clamp 52 is provided at the rear longitudinal end of the table 24 for receiving a first end of a submaster SU as best seen in FIGS. 11–14.

Figure 4:
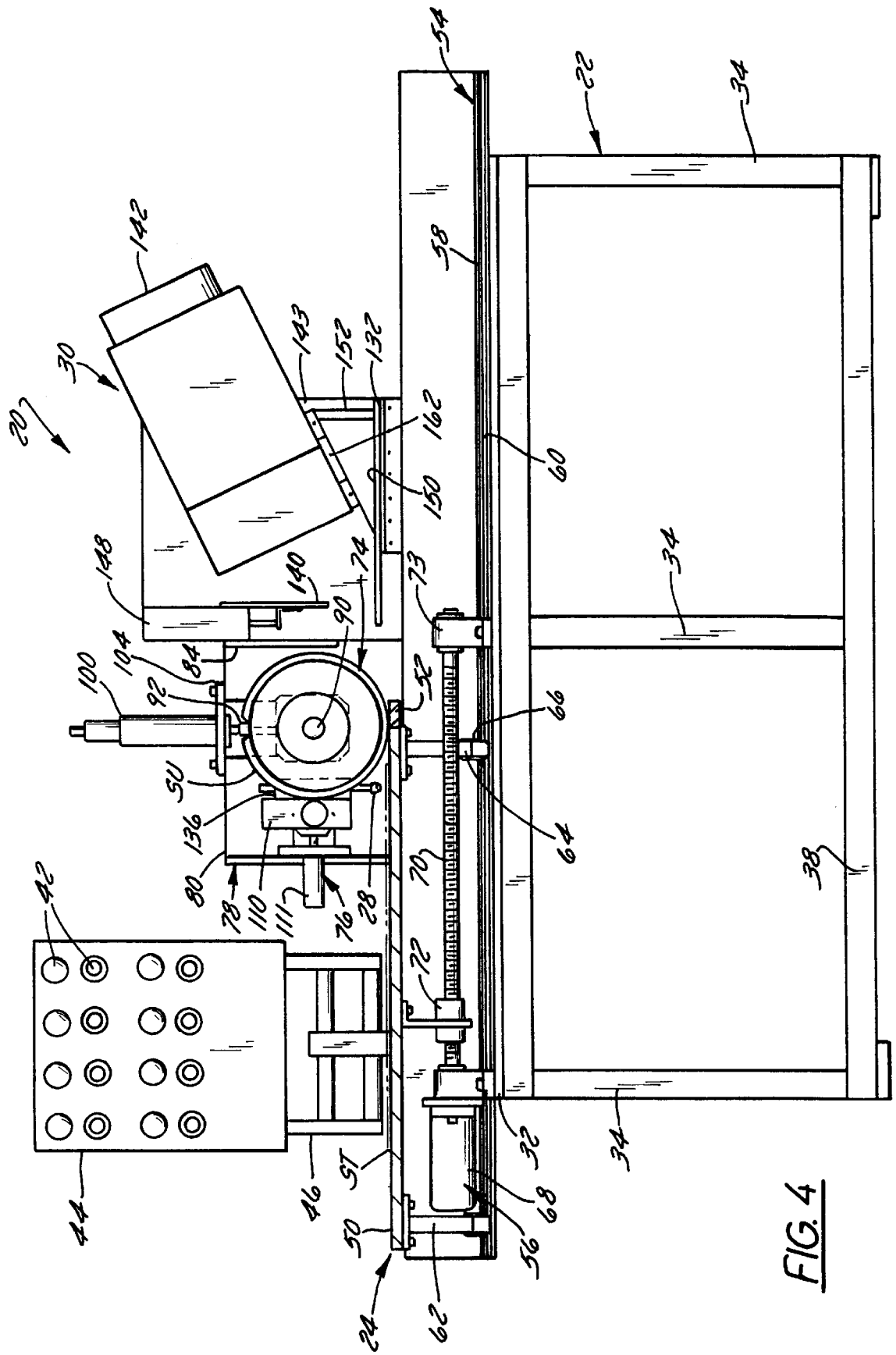
FIG. 4 is a sectional elevation view of the replicator, taken generally along the lines 4—4, in FIG. 1.
Figure 5:
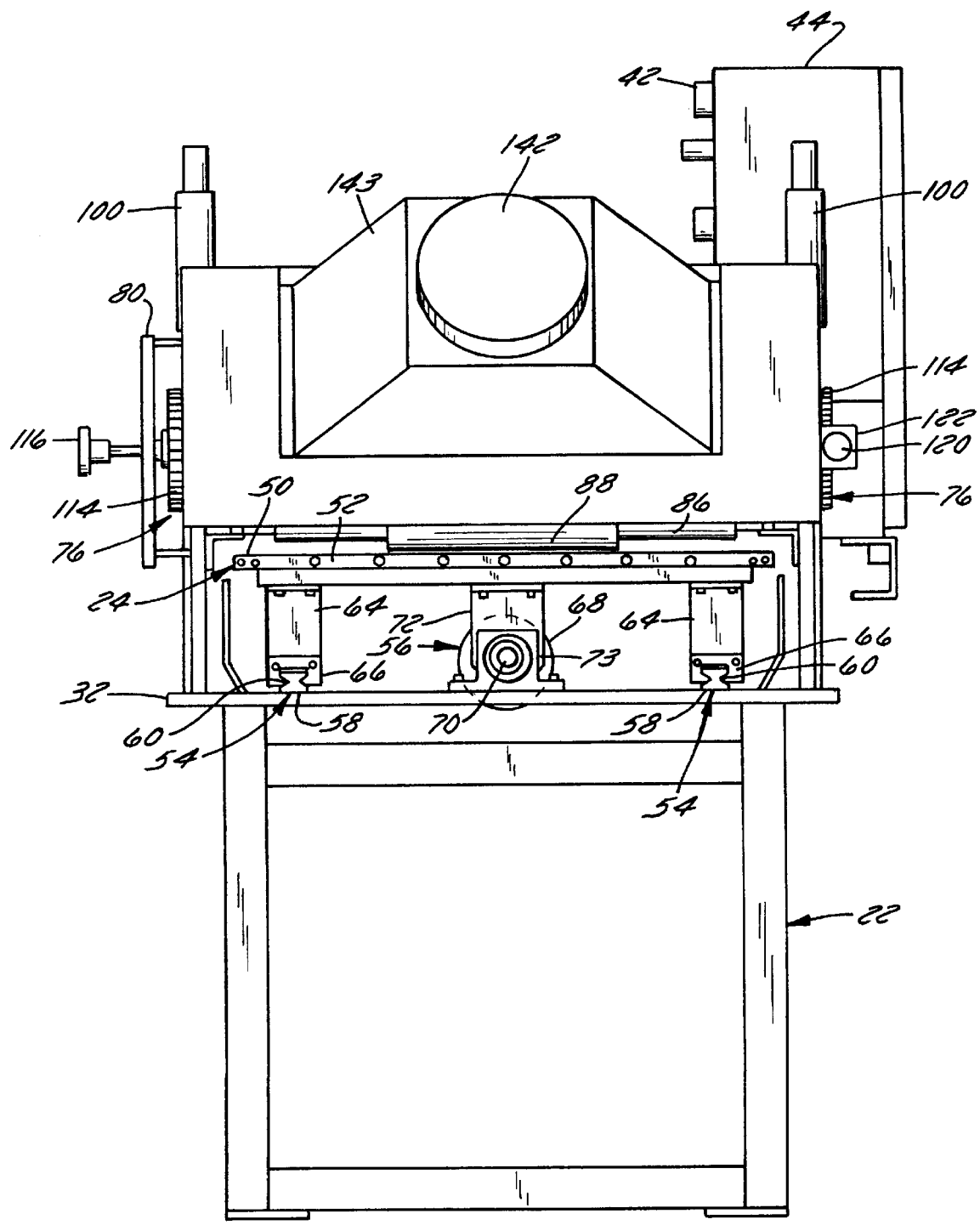
FIG. 5 is a rear end elevation view of the replicator.
Figure 6:
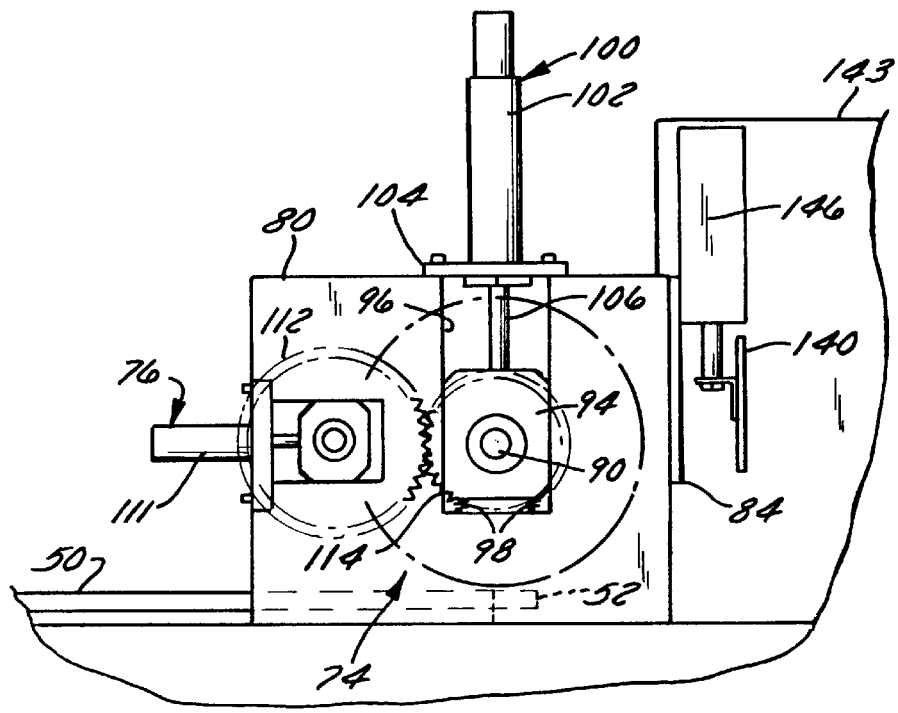
FIG. 6 is a right-side fragmentary elevation view of a portion of the replicator including the impression roller assembly.
Figure 7:
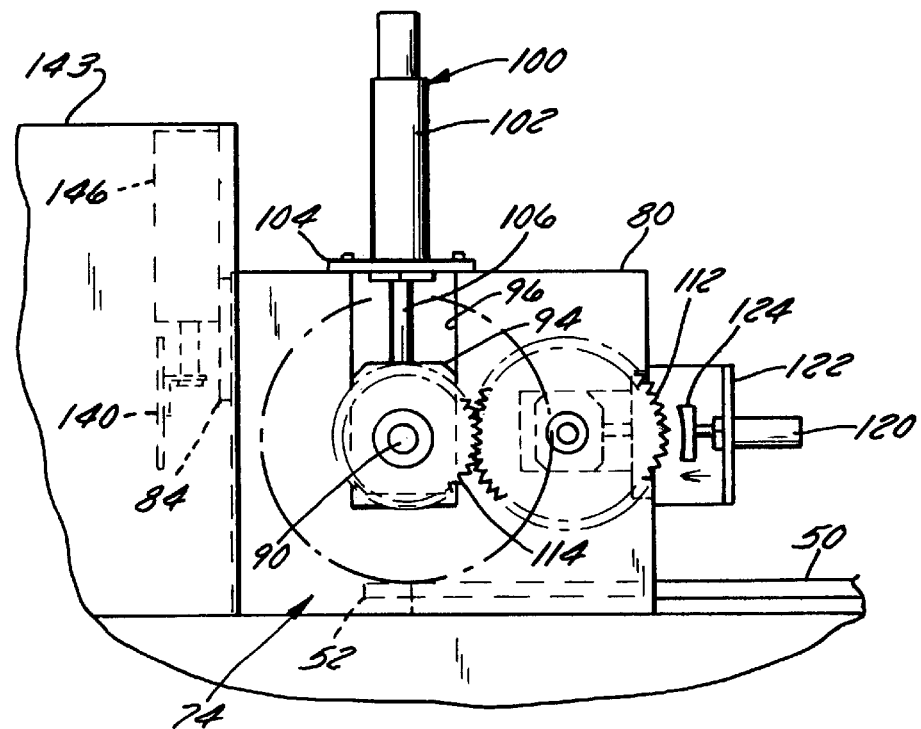
FIG. 7 is a sectional side elevation view taken generally along the lines 7—7 in FIG. 2.

As best seen in FIGS. 4 and 5, the table 24 is mounted on the support surface 32 for movement longitudinally therealong by a pair of laterally opposed, longitudinally extending rails 54. Each of the rails 54 comprises a generally I-shaped bar 58 mounted on the support surface 32 and having grooves 60 formed in opposite sides thereof. A pair of longitudinally spaced, generally inverted U-shaped blocks 62 and 64 are rigidly affixed to the bottom of each side of the table 24. Each of these blocks 62 and 64 has inwardly extending flanges 66 that slidingly mate with the corresponding grooves 60 in the associated rail 54.

The table 24 is driven to move along the rails 54 by a linear drive mechanism 56. The linear drive mechanism 56 may comprise any structure that is coupled to the table 24 and to the upper support surface 32 and that is operable, under the control of the computer 40 and/or the manual controls 42, to drive the table 24 longitudinally relative to the upper support surface 32 at a precisely-controllable rate. The preferred linear actuator is a rotary screw drive comprising a reversible DC electric motor 68, a rotary screw 70, and a threaded sleeve 72. The motor 68 is mounted on the front end of the upper support surface 32, and the sleeve 72 is mounted on a rear end of the bottom surface of the table 24. The screw 70 extends from the motor 68, through the sleeve 72, and to a bearing 73 at its distal end. The bearing 73 rotatably supports the rear end of the screw 70 on the support surface 32. Motor energization causes the screw 70 to rotate within the sleeve 72, thereby driving the sleeve 72 and hence the entire table 24 to move longitudinally along the screw 70.

The impression roller assembly 26 includes as its principal components 1) an impression roller 74 and 2) a rewrapping device 76. The impression roller 74 is spaced above the table 24 to form a nip N therebetween. In addition, the impression roller 74 is coupled to the table 24 to correlate the rotational speed of the roller 74 with the translational speed of the table 24 such that a linear velocity of an outer surface of the roller 74 at least substantially equals the linear velocity of the table 24. In the illustrated and preferred embodiment, this correlation is achieved in part by the submaster SU as detailed below and in part by the rewrapping device 76.

The impression roller 74 and rewrapping device 76 are both mounted on a support assembly 78 mounted on the upper support surface 32 of the frame assembly 22 at a location laterally outside of the table 24 and longitudinally generally central of the support surface 32. The support assembly 78 includes a pair of side support plates 80, a front tie rod 82, and a rear cross 84. The support plates 80 extend vertically from positions flanking sides of the table 24 and terminate at upper ends positioned well above the table 24. The support plates 80 are tied together at their front ends by the tie rod 82 and at their rear ends by the cross plate 84, both of which extend laterally across the table 24 at the upper ends of the support plates 80.

Figure 9:
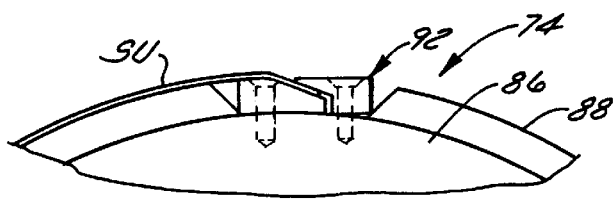
FIG. 9 is an enlarged fragmentary end view of a portion of the impression roller of the replicator.

Referring now to FIGS. 1, 2, 9, and 10 the impression roller 74 comprises 1) a rotatable rigid metal drum 86 and 2) a layer 88 of relatively compressible material mounted on at least a portion of the outer peripheral surface of the drum 86. The drum 86 is mounted on a pair of support shafts 90. Each of the shafts 90 is formed from hardened steel and extends axially outwardly from a respective end of the drum 86. The layer 88 of flexible material is preferably formed from a natural or synthetic rubber such as a silicone having a hardness of 65–70 Durometers. A clamp bar 92 extends axially along the outer peripheral surface of the drum 86 along a gap in the layer 88. The clamp bar 92 is used to attach a second end of the submaster SU to the impression roller 74 as best seen in FIG. 9.

Each of the support shafts 90 is rotatably journaled in a bearing block 94 located axially adjacent an associated end of the drum 86. Each of the bearing blocks 94 is in turn floatingly supported in a guide slot 96 formed in the associated support plate 80 as best seen in FIGS. 6–8 and 10. More specifically, each bearing block 94 is biased from both above and below by a counterbalanced arrangement that permits vertical adjustment of the impression roller 74 for set-up purposes and/or for the purposes of adjusting the pressure imposed on the layered structure during a compression operation. Each of these counterbalanced arrangements includes springs 98 and a linear actuator 100. The springs 98 are disposed in the guide slot 96 so as to extend from an upwardly facing surface of the support plate 80 to a downwardly facing surface of the bearing block 94, thereby biasing the bearing block 94 upwardly. The aggregate biasing force imposed by all springs 98 preferably is commensurate with the weight of the impression roller 74 and the bearing blocks 94. Each linear actuator 100 may comprise any device that is operable, under the control of the computer 40 and/or the manual controls 42, to force the associated bearing block 94 downwardly against the force of the springs 98, thereby to adjust the compressing forces imposed on the layered structure during operation of the replicator 20. The illustrated and preferred linear actuator 100 comprises a double acting pneumatic cylinder having 1) a cylinder portion 102 mounted on a cross bar 104 extending over the top of the vertical guide slot 96 and 2) a rod 106 attached to the bearing block 94.

The purpose of the rewrapping device 76 is to drive the impression roller 74 to rotate so as to wrap the submaster SU back onto the impression roller 74 during the return stroke of the table 24 while relying on the tension of the submaster SU to maintain the desired speed correlation between the impression roller 74 and the table 24. In the illustrated embodiment, the rewrapping device 76 takes the form of a pair of pneumatically actuated rotary air actuators 110, one of which is located at each end of the impression roller assembly 26. The output of each rotary air actuator 110 is operatively coupled to a pinion 112. The pinion 112 meshes with a driven gear 114 fixedly mounted on the end of the associated drum support shaft 90. Accordingly, actuation of the rotary air actuator 110 under control of the computer 40 and/or the manual controls 42 drives the pinion 112 to rotate, thereby driving the gear 114 and the impression roller 74 to rotate. One of the pinions 112 can also be driven manually via a knob 116 to permit manual impression roller rotation for the purposes of set-up or the like. The pinions 112 and the associated rotary air actuators 110 are also movable by a cylinder 111 in the direction of the arrow 118 in FIGS. 1, 2 and 8 between 1) the illustrated operational position in which the pinions 112 mesh with the driven gears 114 and 2) a retracted position in which the pinions 112 are spaced from the gears 114 to permit direct manual rotation of the impression roller 74. Finally, one of the driven gears 114 can be selectively braked so that an operator can lock the impression roller 74 in the position illustrated in the drawings for access to the clamp bar 92. The brake preferably takes the form of a double acting pneumatic cylinder 120 having 1) a cylinder mounted on a support bracket 122 and 2) a rod attached to a brake shoe 124. The brake shoe 124 is selectively moveable into and out of engagement with the teeth of the associated driven gear 114 upon cylinder extension and retraction under the control of one of the manual controls 42.

Figure 8:
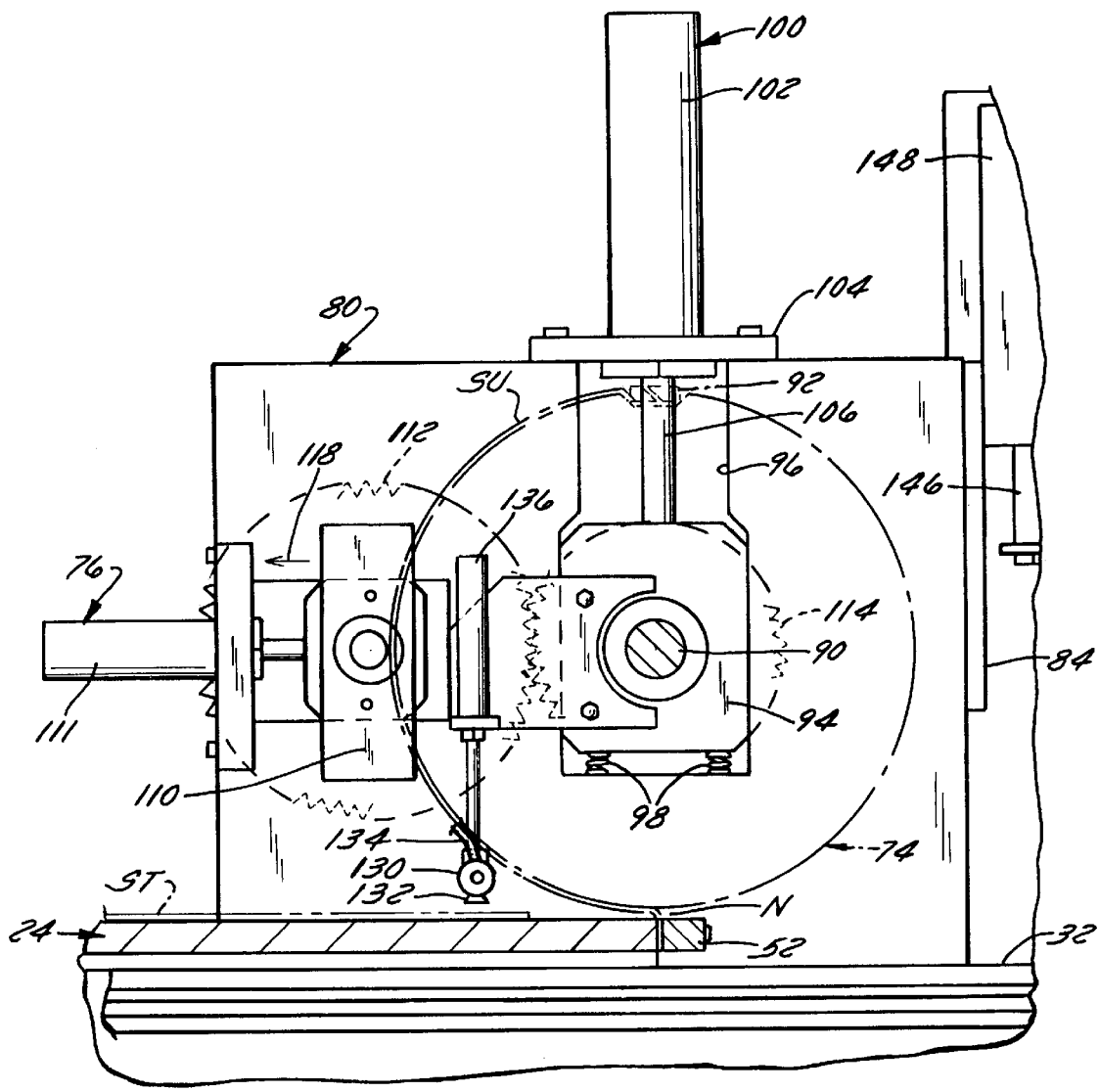
FIG. 8 is a sectional side elevation view taken generally along the lines 8—8 in FIG. 2.
Figure 10:
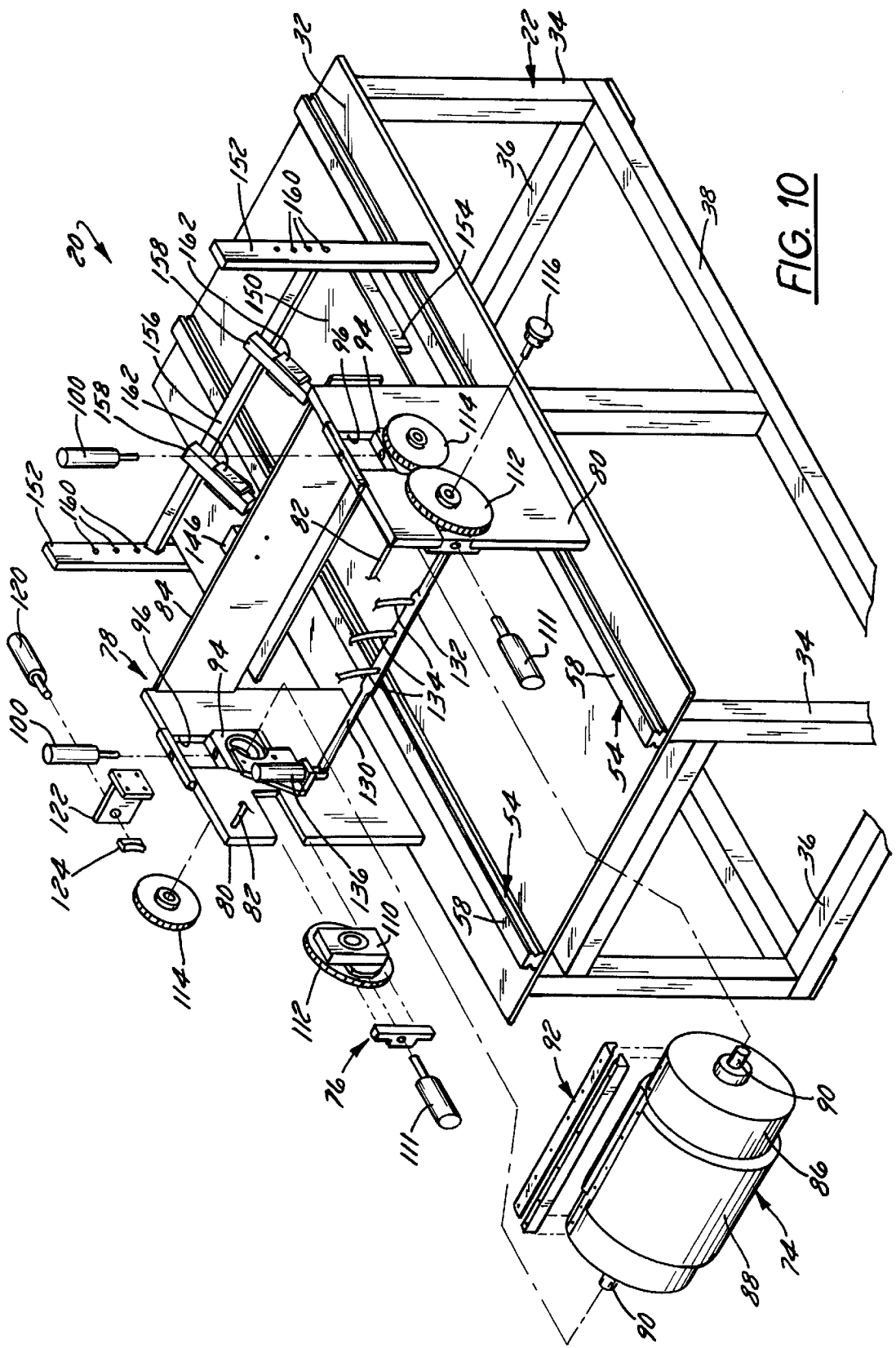
FIG. 10 is an exploded perspective view of a portion of the replicator.

The epoxy dispenser 28 is not critical to the replicator 20 but is beneficial because it contributes to automation of the entire process. The epoxy dispenser 28 could comprise any device capable of dispensing liquid epoxy E, preferably a uniform layer of liquid epoxy, between the submaster SU and the substrate ST before the layered structure is compressed in the nip N. In the illustrated and preferred embodiment, the epoxy dispenser 28 is mounted on the impression roller support assembly 78 just upstream of the impression roller 74. As best seen in FIGS. 8 and 10, the illustrated epoxy dispenser 28 includes a support bar 130 which extends across the table 24, a spray bar 132 which is mounted on the support bar 130, and at least one and preferably several epoxy supply tubes 134. The spray bar 132 has a downwardly-facing outlet slit (not shown) formed therein that is as long or nearly as long as the width of the substrate ST. The spray bar 132 also has a plurality (three in the illustrated embodiment) of inlet orifices therein for the receipt of epoxy. Epoxy E is fed to these orifices from a suitable source (not shown) via the supply tubes 134 at a rate determined by the computer 40. Preferably, in order to permit the epoxy dispenser 28 to be retracted from its operative position when the replicator 20 is not operating, the opposite ends of the support bar 130 are mounted on linear actuators 136 such as double acting pneumatic cylinders so as to permit the support bar 130 to be raised and lowered relative to the table 24.

The curing arrangement 30 may comprise any device capable of curing the epoxy as the table 24 reciprocates under the curing arrangement 30. Most epoxies are cured by exposure to ultraviolet light (UV) light, and the preferred curing arrangement 30 therefore comprises a UV curing assembly. Referring now particularly to FIGS. 1–7 and 10, this assembly includes a shutter 140, a UV light source 142, and an adjustable support structure for the UV light source. The UV light source 142 may comprise any off-the-shelf UV generator and, accordingly, will not be described in detail. The UV light source 142 is preferably encased in a housing 143 extending over and around the UV light source 142.

The shutter 140 comprises a simple metal plate that extends beneath the rear plate 84 of the impression roller support assembly 78. The shutter 140 is movable vertically relative to the plate 84 by way of a double acting pneumatic cylinder 146 operated under the control of the computer 40 and/or the manual controls 42. The cylinder 146 has a rod end connected to the shutter 140 and a cylinder end affixed to the support plate 84. Extension and retraction of the cylinder 146 raises and lowers the shutter 140 between 1) a raised, open position in which a bottom surface of the shutter 140 is spaced well above the table 24 and 2) a lowered, closed position in which the bottom surface of the shutter 140 is positioned rather close to the table 24 to block light from travelling towards the table 24 in the vicinity of the nip N.

The support structure 144 is configured to orient the UV light source 142 so that light emitted therefrom is directed to an impingement point on the table 24 located just downstream of the nip N. The location of the impingement point and the intensity of light impinging at this point can be adjusted by adjusting the location and orientation of the UV light source 142 via suitable adjustment of the support structure 144. Referring particularly to FIGS. 4 and 10, the support structure 144 includes 1) a support plate 150 that extends laterally across the table 24 at a position above the support surface 32 and 2) a pair of vertically extending, laterally spaced vertical support bars 152. The support plate 150 is mounted on the vertical support bars 152 in a cantilevered fashion via a pair of brackets 154 as best seen in FIG. 10. A cross brace 156 extends between the vertical support bars 152 and receives a pair of inclined UV light source mounts 158 that are spaced laterally from one another and that extend forwardly and downwardly from the cross brace 156 to the support plate 150. In order to vary the location at which the light impinges the table 24, the inclination of these mounts 158 can be adjusted by raising and lowering the cross brace 156 relative to the vertical support bars 152. This adjustment is achieved by selecting one of a plurality of vertically spaced sets of mounting holes 160 for mounting the cross brace 156 on the vertical support bars 152. The UV light source 142 is mounted on U-shaped slide plates 162 that, in turn, are slidably mounted on the inclined mounts 158 to permit the light source 142 to slide along the mounts 158, thereby to vary the spacing between the UV light source 142 and the impingement point and thereby to vary the intensity of the light at the impingement point.

3. Operation of Replicator

The entire replication process is performed automatically after set-up by an operator and involves the replication of a surface structure SS on a submaster SU onto a laminate formed from the substrate ST and a layer of cured epoxy E.

The submaster SU is preferably a reusable submaster that is formed from a flexible polycarbonate sheet such as polyethylene and that has the light shaping surface structure of interest SS (FIGS. 12–14) formed on a surface thereof. This submaster SU may be prepared via any suitable process. For instance, in a typical application in which the end product is a viewing screen, a homogenizer, or the like, the submaster is prepared by generating the surface structure SS on a photosensitive medium using coherent light, processing that medium, and replicating the surface structure in a series of submasters, each subsequent generation of which has a viewing angle that is somewhat less than the viewing angle of the master. The submaster replication process is repeated as required until a submaster SU having the desired viewing angle is achieved. A process for forming a submaster in this manner is described in U.S. patent application Ser. No. 09/052,586 to Savant et al., filed Mar. 31, 1998, the subject matter of which is hereby incorporated by reference. The substrate ST may comprise any relatively rigid structure usable in optical applications. The substrate may, for instance, comprise a sheet of glass, acrylic, or a polycarbonate structure such as polyester. The epoxy E may comprise any liquid epoxy that is capable of being laminated onto the substrate and then cured by exposure to UV light.

The operator prepares the replicator 20 for operation by first attaching one end of the submaster SU to the impression roller 74 using the clamp bar 92, then wrapping the submaster SU approximately 180° around the silicone layer 88 of the impression roller 74, and then attaching the other end of the submaster SU to the table 24 using the clamp 52. The submaster SU now assumes the position seen in FIG. 11, in which it is attached to the table 24 and the impression roller 74 and in which it is wrapped part-way around the impression roller 74. In the illustrated embodiment in which the silicone layer 88 of the impression roller 74 has a diameter of about 10" and a length of about 11.5", the impression roller 74 is capable of receiving a submaster SU that is approximately 30" long by 11.5" wide. The operator then completes the set-up operation by placing a sheet of a substrate ST on the surface 50 of the table 24 as seen in FIG. 11.

The operator can then initiate a replication procedure by entering a suitable command into the computer 40 to supply energizing current to the electric motor 68 to drive the table 24 to the right as illustrated by the arrow 178 in FIG. 12. The speed of table movement will vary from application to application depending upon several factors including the complexity and/or viewing angle of the replicated surface structure SS and the cure rate of the epoxy E. As the table 24 moves, the dispensing cylinders 136 are actuated to lower the epoxy dispenser 28 into its operative position, and the epoxy dispenser 28 dispenses a uniform layer of epoxy onto the substrate ST at a location just upstream of the nip N. Movement of the table 24 also unwraps the submaster SU from the impression roller 74 to drive the impression roller 74 to rotate in the direction of arrow 180 in FIG. 12. Rotation of the driven gear 114 drives the pinion 112 to rotate in the opposite direction as represented by arrow 182. This rotation is accommodated by the ability of the rotary actuators 110 to rotate through a full 360°. By using the submaster SU as a drive belt for the roller 74 in this manner, the roller velocity is automatically correlated to table velocity so that the linear velocity of the outer surface of the roller 74 matches the linear velocity of the table 24 through the nip N. As a result, there is no slippage between the submaster SU and the substrate ST as the layered structure, comprised of the substrate ST, the epoxy E, and the submaster SU, is compressed in the nip N. The pressures imposed on the layered structure by the impression roller 74 during this compression typically will range from 20–40 lbs per linear inch at the line of contact and can be set by suitable actuation of the pneumatic cylinders 100.

As the compressed layered structure on the downstream end of the table 24 moves beyond the nip N, the computer 40 actuates the pneumatic cylinder 146 to raise the shutter 140 so that the epoxy E of the layered structure begins to be cured by exposure to UV light almost immediately after the compressed layered structure emerges from the nip N. The process of applying epoxy E to the substrate ST, unwrapping the submaster SU from the compression roller 74, pressing the submaster SU onto the epoxy E to form a compressed layered structure, and curing the epoxy E in the compressed layered structure continues through a full forward stroke of the table 24, at which point (FIG. 12) nearly the entire submaster SU is pressed onto the substrate ST to produce a planar layered structure in which the light shaping surface structure SS on the submaster is replicated on the epoxy E and in which the epoxy is at least partially cured.

The electric motor 68 is then reversed to drive the table 24 through its return stroke or in the direction of arrow 184 in FIG. 13. During this movement, the layered structure is again exposed to UV light to finish the process of curing the epoxy E, thereby leaving a substrate/epoxy laminate covered by the submaster SU. Simultaneously, the rotary air cylinders 110 are actuated to drive the impression roller 74 and pinion 112 to rotate in the direction of arrows 186 and 188 in FIG. 13. Roller rotation peels the submaster SU from the substrate/epoxy laminate and progressively rewraps the submaster SU back onto the impression roller 74. At the end of the table return stroke, the shutter 140 closes, and motive power to the table motor 68 and the rotary air actuator 110 is cut off to arrest the table 24 and the roller 74 in the positions illustrated in FIG. 14. The dispensing cylinders 136 then automatically return to their retracted positions. The optical product, comprising a substrate/cured epoxy laminate having the desired light shaping surface structure SS thereon, can be carried away by the operator, who then places a new substrate ST on the table 24 and commands the computer 40 to repeat the process.

The entire replication process, from initial table movement in its forward stroke to the termination of table movement in its return stroke, typically takes no more than twenty seconds, permitting a production rate of up to 100 units per hour. This rate represents a dramatic improvement over previously-known production rates of five-to-ten units per hour. Moreover, the quality of the resultant product is improved due to 1) the uniform compression of the layered structure due to the uniform line-to-surface contact in the nip N and 2) the lack of slippage between the submaster SU and the substrate ST due to the correlation between the velocity of the table 24 and the velocity of the impression roller 74.

Many changes and modifications could be made to the invention without departing from the spirit thereof. The scope of these changes will become apparent from a reading of the appended claims.

I claim:

1. A method of replicating a light shaping surface structure comprising:
   (A) positioning a layered structure in a nip formed between an outer surface of an impression roller and a table, said layered structure including 1) a relatively rigid substrate which is supported on said table, 2) a submaster which has said surface structure on a surface thereof which faces toward said table, and 3) a layer of epoxy disposed between said substrate and said submaster;

(B) automatically compressing said layered structure in said nip so as to replicate said surface structure on said layer of epoxy while moving at least one of said table and said roller linearly relatively to the other of the table and said roller so as to prevent relative sliding movement between said substrate and said submaster;

(C) curing said layer of epoxy; and (D) separating said submaster from said substrate to leave a substrate/epoxy laminate having said surface structure on a surface thereof.

2. A method as defined in claim 1, wherein the compressing step comprises rotating said roller about a non-translating axis while translating said table with respect to said roller.

3. A method as defined in claim 2, further comprising, during the compressing step, correlating movement of said roller with movement of said table so that a linear velocity of said outer surface of said roller at least substantially equals a linear velocity of said table.

4. A method of replicating a light shaping surface structure, comprising:

(A) positioning a layered structure in a nip formed between an outer surface of an impression roller and a table, said layered structure including 1) a relatively rigid substrate which is supported on said table, 2) a submaster which has said surface structure on a surface thereof which faces toward said table, and 3) a layer of epoxy disposed between said substrate and said submaster;

(B) automatically compressing said layered structure in said nip so as to replicate said surface structure on said layer of epoxy, wherein the compressing step comprises rotating said roller about a non-translating axis while translating said table with respect to said roller, and wherein movement of said roller is correlated with movement of said table so that a linear velocity of said outer surface of said roller at least substantially equals a linear velocity of said table;

(C) curing said layer of epoxy; and (D) separating said submaster from said substrate to leave a substrate/epoxy laminate having said surface structure on a surface thereof; and wherein said submaster comprises a flexible sheet, wherein one end of said submaster is attached to said roller and another end of said submaster is attached to said table, and wherein the correlating step comprises transmitting driving forces to said roller from said table via said submaster so that said submaster progressively unwraps from said roller and is pressed against said substrate in said nip to form said layered structure.

5. A method as defined in claim 4, wherein said table reciprocates through a forward stroke and a return stroke, wherein said table drives said roller to rotate only during said forward stroke, and wherein said separating step comprises driving said roller to rotate in a wrapping direction during the return stroke of said table to progressively 1) peel said submaster from said laminate and 2) wrap said submaster back onto said roller.

6. A method as defined in claim 3, wherein an initial step in forming said layered structure comprises automatically dispensing an epoxy onto said substrate immediately prior to the compressing step, the dispensing step being performed via an epoxy dispenser spaced from said table at a location upstream of said roller.

7. A method as defined in claim 1, wherein the curing step comprises exposing said layered structure to UV light.

8. A method as defined in claim 1, wherein the curing step is performed in-line with the compressing step such that one portion of said layered structure is subjected to the curing step while another portion of said layered structure is being compressed in said nip.

9. A method of replicating a light shaping surface structure, comprising:

(A) supporting a relatively rigid substrate on a table;

(B) wrapping a relatively flexible submaster at least part-way around an outer surface of an impression roller, said outer surface of said roller being spaced from said table to form a nip therebetween, said submaster having said surface structure on a surface thereof which faces away from said roller;

(C) depositing a layer of epoxy between said submaster and said substrate;

(D) unwrapping said submaster from said roller and compressing said submaster, said layer of epoxy, and said substrate in said nip so as to replicate said surface structure on said layer of epoxy, thereby forming a layered structure, the unwrapping and compressing step comprising driving said table past said roller while driving said roller to rotate at a rotational velocity at which a linear velocity of said outer surface of said roller at least substantially equals a linear velocity of said table;

(E) curing said layer of epoxy; and (F) separating said submaster from said substrate to leave a substrate/epoxy laminate having said surface structure on a surface thereof.

10. A method as defined in claim 9, wherein one end of said submaster is attached to said roller and another end of said submaster is attached to said table, and wherein movement of said table past said roller applies tension to said substrate to unwrap said substrate from said roller and to drive said roller to rotate.

11. A method as defined in claim 10, wherein said table reciprocates through a forward stroke and a return stroke, wherein said table drives said roller to rotate only during said forward stroke, and wherein said separating step comprises driving said roller to rotate in a rewrapping direction during the return stroke of said table so as to progressively 1) peel said submaster from said laminate and 2) wrap said submaster back onto said roller.

12. A method of replicating a light shaping surface structure, comprising:

(A) supporting a relatively rigid substrate on a table;

(B) attaching one end of a relatively flexible reusable submaster to an outer surface of an impression roller, said outer surface of said roller being spaced from said table to form a nip therebetween, said submaster having said surface structure on a surface thereof;

(C) wrapping said submaster at least part-way around said outer surface of said roller such that said surface of said submaster faces away from said roller;

(D) attaching another end of said submaster to said table at a location downstream from said roller;

(E) depositing a layer of epoxy between said submaster and said substrate;

(F) unwrapping said submaster from said roller and compressing said submaster, said layer of epoxy, and said substrate in said nip so as to replicate said surface structure on said layer of epoxy, thereby forming a layered structure, the unwrapping and compressing step comprising driving said table in a first direction to apply tension to said submaster, thereby causing said submaster to unwrap from said roller and to drive said roller to rotate in an unwrapping direction at a rotational velocity at which a linear velocity of said outer surface of said roller at least substantially equals a linear velocity of said table;

(G) curing said layer of epoxy; and (H) separating said submaster from said substrate to leave a substrate/epoxy laminate having said surface structure on a surface thereof.

13. A method as defined in claim 12, wherein the separating step comprises driving said table past said roller in a second direction while driving said roller to rotate in a rewrapping direction so as to cause said submaster to peel from said substrate and to wrap back onto said roller.

14. A method of replicating a light shaping surface structure, comprising:

(A) supporting a relatively rigid substrate on a table;

(B) attaching one end of a relatively flexible reusable submaster to an outer surface of an impression roller, said outer surface of said roller being spaced above said table to form a nip therebetween, said submaster having said surface structure on a surface thereof;

(C) wrapping said submaster at least part-way around said outer surface of said roller such that said surface of said submaster faces away from said roller;

(D) attaching another end of said submaster to said table;

(E) driving said table to move under said roller in a first direction to apply tension to said submaster, thereby 1) causing said submaster to unwrap from said roller and to drive said roller to rotate in an unwrapping direction at a rotational velocity at which a linear velocity of said outer surface of said roller at least substantially equals a linear velocity of said table and 2) compressing said submaster and said substrate in said nip;

(F) during the driving step, dispensing epoxy onto said substrate from a dispenser disposed above said table a location upstream from said nip so that, after the compressing step, said epoxy 1) is sandwiched between said substrate and said submaster and 2) has said surface structure replicated on a surface thereof;

(G) during the driving step, curing said epoxy using a UV light source disposed above said table at a location downstream of said roller; and (H) driving said table past said roller in a second direction while driving said roller to rotate in a rewrapping direction so as to cause said submaster to separate from said substrate and to wrap back onto said roller, thereby leaving substrate/epoxy laminate having said surface structure on a surface thereof.

15. A replicator for replicating a light shaping surface structure on a relatively rigid substrate, said replicator comprising:

(A) a table having a generally planar support surface, said table being movable at least generally in parallel with a direction of extension of said support surface;

(B) an impression roller having an outer surface which is spaced from said support surface of said table to form a nip therebetween, said roller being mounted on a support shaft extending axially with respect to said roller and laterally with respect to said table, said roller being configured to receive a submaster on said outer surface thereof, said submaster having said surface structure on a surface thereof which faces away from said roller; and (C) a drive arrangement which drives said table and said roller such that, as said table moves through said nip, said roller rotates at a rotational velocity at which a linear velocity of said outer surface of said roller at least substantially equals a linear velocity of said support surface of said table, thereby compressing the substrate and the submaster in the nip wherein a first end of said submaster is attached to said roller and a second end of said submaster is attached to said table.

16. A replicator for replicating a light shaping surface structure on a relatively rigid substrate, said replicator comprising:

(A) a table having a generally planar support surface, said table being movable at least generally in parallel with a direction of extension of said support surface;

(B) an impression roller having an outer surface which is spaced from said support surface of said table to form a nip therebetween, said roller being mounted on a support shaft extending axially with respect to said roller and laterally with respect to said table, said roller being configured to receive a submaster on said outer surface thereof, said submaster having said surface structure on a surface thereof which faces away from said roller; and (C) a drive arrangement which drives said table and said roller such that, as said table moves through said nip, said roller rotates at a rotational velocity at which a linear velocity of said outer surface of said roller at least substantially equals a linear velocity of said support surface of said table, thereby compressing the substrate and the submaster in the nip, wherein the drive arrangement comprises 1) a motor which drives said table to move linearly and 2) a coupling which is connected to said table and to said roller and which converts translational movement of said table to rotational movement of said roller, and wherein said coupling comprises 1) a device on said roller permitting a first end of the submaster to be attached to said roller and permitting the submaster to be wrapped at least part-way around said outer surface of said roller and 2) a device on said table permitting a second end of the submaster to be attached to said table.

17. A replicator as defined in claim 16, wherein said motor reciprocatingly drives said table through forward and return strokes, and wherein said drive arrangement further comprises a rewrapping drive device which, during said return strokes of said table, drives said roller to wrap the submaster back onto said outer surface of said roller.

18. A replicator as defined in claim 17, wherein said rewrapping drive device comprises 1) a rotary cylinder, 2) a pinion which is driven to rotate by said rotary cylinder, and 3) a driven gear which meshes with said pinion and which is mounted on said support shaft.

19. A replicator as defined in claim 15, wherein said support shaft is supported on first and second bearings located adjacent opposite sides of said table, and further comprising, for each of said bearings, 1) a counterbalancing spring which biases said bearing away from said table, and 2) a linear actuator which is selectively actuatable to force said bearing towards said table.

20. A replicator as defined in claim 15, further comprising an epoxy dispenser which is spaced from said table at a location upstream of said roller and which is configured to dispense epoxy onto the substrate.

21. A replicator as defined in claim 20, wherein said epoxy dispenser comprises 1) a support which extends across said table and which is movable between an extended position and a retracted position, 2) a spray bar which is mounted on said support and which has an epoxy inlet and an epoxy outlet, and 3) at least one epoxy supply tube connected to said epoxy inlet of said spray bar.

22. A replicator as defined in claim 15, further comprising a brake which is selectively actuatable to prevent said roller from rotating.

23. A replicator as defined in claim 16, further comprising an epoxy curing device which is spaced from said table at a location downstream of said roller.

24. A replicator as defined in claim 23, wherein said epoxy curing device comprises a UV light source.

25. A replicator for replicating a light shaping surface structure on a relatively rigid substrate, said replicator comprising:

(A) a table having an upwardly-facing generally planar support surface, said table being movable at least generally in parallel with said support surface;

(B) an impression roller having an outer surface which is spaced above said support surface to form a nip therebetween, said roller being supported on a support shaft extending axially with respect to said roller and laterally with respect to said table, said roller being configured to receive a submaster on said outer surface thereof; and (C) a drive arrangement which drives said table and said roller, said drive arrangement including
(1) an electric motor which drives said table to move longitudinally with respect to said support surface, and
(2) the submaster, wherein the submaster a) has a first end which is attached to said roller, b) has a second end which is attached to said table, and c) is wrappable at least part-way around said outer surface of said roller, the submaster coupling said table to said roller such that, as said table moves through said nip, said roller rotates at a rotational velocity at which a linear velocity of said outer surface of said roller at least substantially equals a linear velocity of said table, thereby compressing the substrate and the submaster in the nip.

26. A replicator as defined in claim 25, wherein said motor reciprocatingly drives said table through forward and return strokes, and wherein said drive arrangement further comprises a rewrapping drive device which, during said return strokes of said table, drives said roller to wrap the submaster back onto said outer surface of said roller.

27. A replicator for replicating a light shaping surface structure on a relatively rigid substrate, said replicator comprising:

(A) a table having an upwardly-facing generally planar support surface, said table being movable at least generally in parallel with said support surface;

(B) an impression roller having an outer surface which is spaced above said support surface to form a nip therebetween, said roller being rotatable via a roller drive shaft extending axially with respect to said roller and laterally with respect to said table, said roller being configured to receive a submaster on said outer surface thereof such that 1) a first end of said submaster is attached to said roller, 2) said submaster wraps at least part-way around said outer surface, and 3) a second end of the submaster is attached to said table at a location downstream of said roller, wherein the submaster has said surface structure on a surface thereof which faces away from said roller;

(C) an epoxy dispenser which is spaced above said table at a location upstream of said roller and which is configured to dispense a layer of epoxy onto the substrate;

(D) an electric motor which reciprocatingly drives said table to move longitudinally with respect to said support surface so that, as said table moves through said nip in a first direction, said roller rotates at a rotational velocity at which a linear velocity of said outer surface of said roller at least substantially equals a linear velocity of said table, thereby compressing the substrate, the layer of epoxy, and the submaster in said nip;

(E) a rotary cylinder which drives said roller to wrap said submaster back onto said outer surface of said roller when said motor drives said table in a second direction which is opposite said first direction; and (F) a UV light source which is spaced above said table at a location downstream of said roller and which is configured to cure the epoxy.

28. A method of replicating a light shaping surface structure, comprising:

(A) positioning a layered structure in a nip formed between an outer surface of an impression roller and a table, said layered structure including 1) a relatively rigid substrate which is supported on said table, 2) a submaster which has said surface structure on a surface thereof which faces toward said table, and 3) a layer of epoxy resin disposed between said substrate and said submaster;

(B) rotating said roller while 1) translating said table and said layered structure with respect to said roller to move said nip across said layered structure and to replicate said surface structure on said layer of resin, and 2) coordinating the speeds of table translation and roller rotation to prevent slippage of said substrate relative to said submaster;

(C) curing said layer of epoxy; and (D) separating said submaster from said substrate to leave a substrate/epoxy laminate having said surface structure on a surface thereof.

* * * * *